United States Patent
Por

(10) Patent No.: US 11,231,937 B2
(45) Date of Patent: Jan. 25, 2022

(54) AUTONOMOUS HOST DETECTION FOR COMMUNICATION PORT MANAGEMENT

(71) Applicant: Intel Corporation, Santa Clara, CA (US)

(72) Inventor: Choon Gun Por, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 15/792,451

(22) Filed: Oct. 24, 2017

(65) Prior Publication Data

US 2019/0121647 A1 Apr. 25, 2019

(51) Int. Cl.
| | |
|---|---|
| *G06F 9/00* | (2006.01) |
| *G06F 9/4401* | (2018.01) |
| *G06F 11/30* | (2006.01) |
| *G06F 13/38* | (2006.01) |
| *G06F 21/57* | (2013.01) |
| *G06F 21/85* | (2013.01) |

(52) U.S. Cl.
CPC ........ *G06F 9/4411* (2013.01); *G06F 11/3051* (2013.01); *G06F 13/385* (2013.01); *G06F 21/575* (2013.01); *G06F 21/85* (2013.01); *G06F 2213/0042* (2013.01)

(58) Field of Classification Search
CPC ............... G06F 9/4411; G06F 11/2284; G06F 11/3051; G06F 13/385; G06F 21/575; G06F 21/85; G06F 2213/0042; Y02D 10/00

See application file for complete search history.

(56) References Cited

U.S. PATENT DOCUMENTS

| | | | | |
|---|---|---|---|---|
| 6,292,859 B1 * | 9/2001 | Santiago | ............... | G06F 9/4411 710/10 |
| 2003/0191877 A1 * | 10/2003 | Zaudtke | ............... | G06F 11/0709 710/72 |
| 2016/0170932 A1 * | 6/2016 | Lin | ........................ | G06F 13/287 710/313 |
| 2016/0179648 A1 * | 6/2016 | Srivastava | .......... | G06F 13/4295 710/16 |
| 2017/0192924 A1 * | 7/2017 | Chiba | ................. | G06F 13/4282 |
| 2018/0060270 A1 * | 3/2018 | Schnell | ............... | G06F 13/4022 |

(Continued)

FOREIGN PATENT DOCUMENTS

WO WO-2017112046 A1 * 6/2017 ............ G06F 11/221

OTHER PUBLICATIONS

IEEE Std 802.11—2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

(Continued)

*Primary Examiner* — Nitin C Patel
(74) *Attorney, Agent, or Firm* — Nicholson, De Vos, Webster & Elliott, LLP

(57) ABSTRACT

A method and system method for communication port management in a device. The method including enabling a set of communication ports in response to power up of the device, detecting connection at a port in the set of communication ports prior to operating system boot of the device, and connecting an external device to an operational component of the device in response to the connection at the port.

17 Claims, 11 Drawing Sheets

(56) References Cited

U.S. PATENT DOCUMENTS

2018/0069861 A1* 3/2018 Persinger .............. H04L 63/102
2020/0257601 A1* 8/2020 Srivastava ............ G06F 11/221

OTHER PUBLICATIONS

IEEE Std 802.11a—1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.
IEEE Std 802.11ac—2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.
IEEE Std. 802.11b—1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.
IEEE Std 802.11g—2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.
IEEE Std 802.11n—2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
JEDEC Standard, "Low Power Double Data Rate 2 (LPDDR2)," JESD209-2E (Revision of JESD209-2D, Dec. 2010), JEDEC Solid State Technology Association, Apr. 2011, 284 pages.
PCI Express® Base Specification Revision 3.0, Nov. 10, 2010, 860 pages.
TPM Main Part 1 "Design Principles," Specification Version 1.2, Revision 62, TCG Copyright, Oct. 2, 2003, 161 pages.
TPM Main Part 2 "TPM Structures," Specification Version 1.2, Revision 62, TCG Published, Oct. 2, 2003, 176 pages.
"Universal Serial Bus Power Delivery Specification," Revision 3.0, V1.0a, ECNs, Aug. 2, 2016, 528 pages.
"Universal Serial Bus Type-C Cable and Connector Specification," Release 1.2, Mar. 25, 2016, 221 pages.
"Universal Serial Bus Type-C Cable and Connector Specification," Release 1.3, Jul. 14, 2017, 241 pages.
Wigig White Paper, Wireless Gigabit Alliance, Defining the Future of Multi-Gigabit Wireless Communications, Jul. 2010, 5 pages.

* cited by examiner

AUTONOMOUS HOST DETECTION FOR COMMUNICATION PORT MANAGEMENT

TECHNICAL FIELD

Embodiments of the invention relate to the field of interconnects; and more specifically, to a system and method for enabling low level connection to operational components of communication ports without an operating system executing.

BACKGROUND

Mobile devices such as smartphones, tablets, ultra-mobile or ultra-lite personal computers or laptops and similar devices may have a number of physical communication ports that enable communication with connected devices. These mobile devices often are manufactured with the majority of their internal electronic components integrated on a single board and many components with in a single chip, where this type of architecture is referred to as a System on a Chip (SoC). In addition, the SoC and other internal components of the mobile devices may be housed in a chassis that is not designed for a user to be able to open or access the SoC. Even experienced technicians may have significant difficulty in accessing the internal components and the SoC without damaging the housing or chassis.

This makes servicing and diagnosing mobile devices more difficult and more costly, as there are likely to be specialized tools necessary to access these internal components. In addition, if the components are a part of the SoC, then even access to the components within the housing is likely to be insufficient as the components of the SoC are likely only reasonably accessible via the communication ports of the mobile devices. In addition, verifying the operation of the SoC at the type of manufacture and assembly is also more difficult.

Thus, for the purposes of debugging, diagnostic analysis, testing or similar characterization utilization of these communication ports to interface with the components of the SoC has become a critical path to testing the products and ensuring a reasonable time to market. Testing the components of the SoC requires that the communication ports be placed into a debugging mode or similar state. However, establishing such a debugging mode requires that the hardware of the SoC and the firmware components of the SoC are mostly functional and operational (i.e., able to boot the operating system). Since these communication ports are functional ports too (i.e., the communication ports function to transfer data and their use for testing and diagnostics is typically secondary), separating the usages (functional (data transfer) vs nonfunctional (testing and diagnostics) is an important design consideration.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
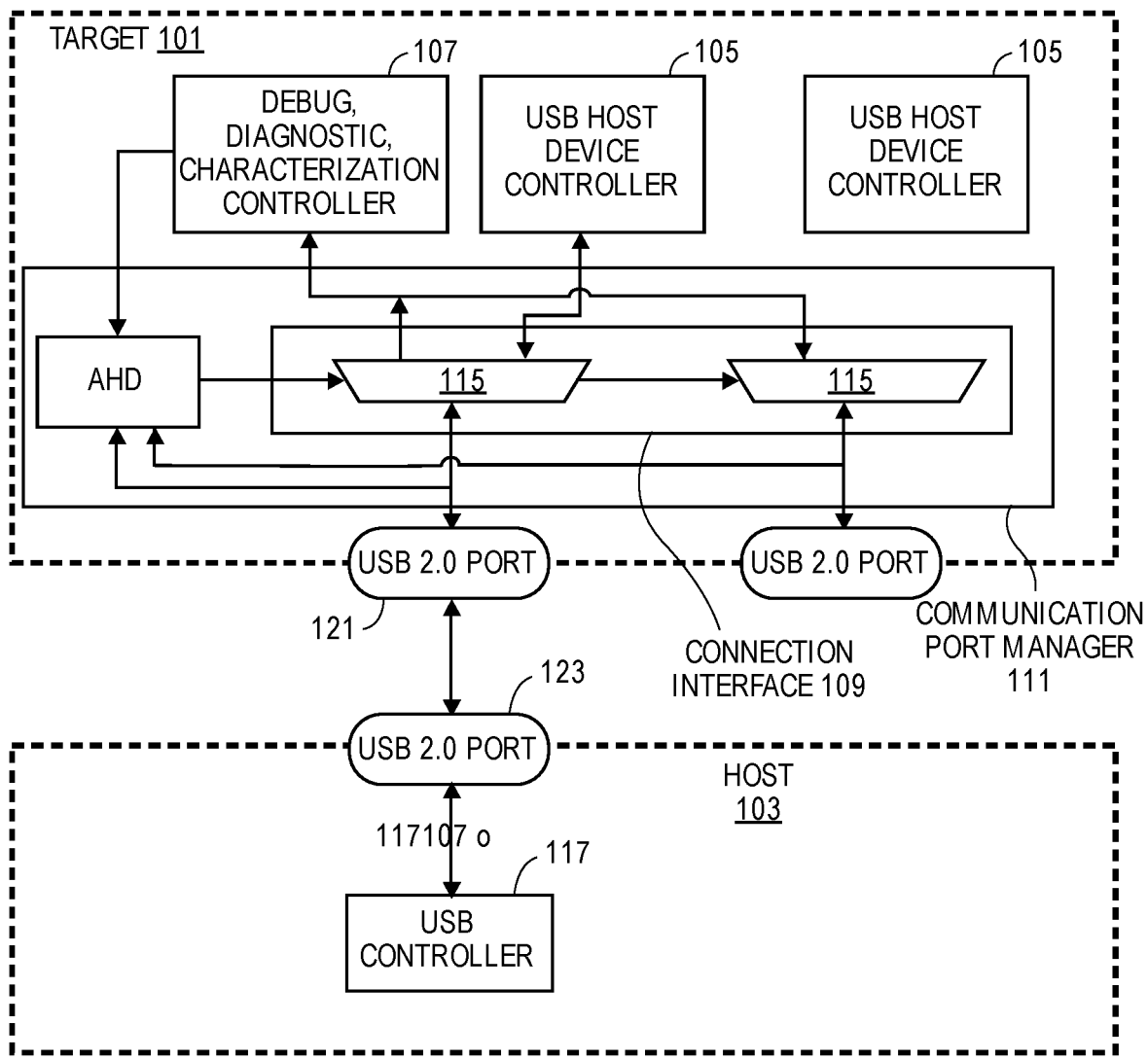
FIG. 1 is a diagram of one embodiment of the operational components of a target device that is connected to a host device.

In the following description, numerous specific details are set forth. However, it is understood that embodiments of the disclosure may be practiced without these specific details. In other instances, well-known circuits, structures, and techniques have not been shown in detail in order not to obscure the understanding of this description. The embodiments provide a method and system that enables nonfunctional uses of communication ports for computing devices, in particular for mobile devices where they may have a fixed housing and System on a Chip (SoC) architecture. Nonfunctional uses of communication ports are uses such as debugging and testing, in contrast to functional uses such as data communication. In some embodiments, the communication ports can be Universal Serial Bus (USB) ports such a USB 2.x or 3.x having any form factor (Type A, B, or C). The embodiments provide an autonomous hardware process that detects connections at the ports and initiate a nonfunctional session with the connected devices without requiring device attached to the port to be executing higher level software environments such as operating systems.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronics (e.g., computing systems) generally employ one or more electrical connections (e.g., wired or wireless connections) to facilitate the transmission and reception of data (e.g., communication) between devices, such as, but not limited to, between a computing system (e.g., a computer including a hardware processor) and a (e.g., external) peripheral. Non-limiting examples of peripherals are external storage devices (e.g., hard disk drives) and mobile devices (e.g., smartphones and tablets).

Certain electrical connections (e.g., couplings) include parallel conductors (e.g., parallel wires or other electrically conductive paths). One embodiment of an electrical connection is a bus. One embodiment of a bus is a multiple conductor bus, for example, where the conductors (e.g., wires) allow parallel (e.g., concurrent) transmittal of data thereon. The term electrical connection (e.g., bus) may generally refer to one or more separate physical connections, communication lines and/or interfaces, shared connections, and/or point-to-point connections, which may be connected by appropriate bridges, hubs, adapters, and/or controllers. A serial bus (e.g., serial bus architecture) may generally refer to a (e.g., shared) communication channel that transmits data one bit after another (e.g., sequentially), for example, over a (e.g., each) single wire or fiber.

The phrase Universal Serial Bus (USB) generally refers to a specification(s) for a serial bus that supports the transmission and reception of data (e.g., and power and/or control) between a downstream facing port (e.g., a host) and one or more upstream facing ports (e.g., devices), for example, through one or more hubs there between. Where USB ports and similar communication ports are present in devices, they are typically initialized and controlled by a USB controller that is provided by an operating system of the device and that is activated during the boot-up process for the device.

If there is a need to test or debug a device that includes physical communication ports, then it is required that the operating system and similar higher-level software is executing to enable the communication ports to be configured to operate in a debug or test mode, rather than a standard data transfer mode. Use of these debug or test modes require expert user intervention to allow and disallow debug, diagnostic or similar characterization through these communication ports. Therefore, the device must be able to boot and if that is not the case, then debugging, diagnostics and testing are not possible, because such functions rely on relevant hardware (HW), firmware (FW), and software (SW) components to be somewhat functional, before the expert user can switch the functional communication ports into a nonfunctional mode. If this is not the case, then the nonfunctional use cases would be severely limited, and breaking into the chassis of the device maybe required to activate or test the components of the device.

The embodiments overcome these limitations. The embodiments provide a system and method that is compatible with any communication port type, including any USB port types (Type A/AB/B/C). Being able to debug, diagnose and characterize any form factor without breaking into the chassis and reusing the functional ports for nonfunctional usages is an invaluable tool to achieve greater quality, throughput and to shorten time to market.

The embodiments are implemented with related hardware and software processes, with many of these hardware and software processes as a combination that can be referred to as Autonomous Host Detection or AHD. AHD enables a device to detect and initiate a nonfunctional usage without requiring any user intervention and without requiring the device to be able to boot, even if most hardware (HW), firmware (FW) and software (SW) components of the device are not functioning correctly.

FIG. 1 is a diagram of one embodiment of a device that is coupled to an external device via a communication port. In the example, the device, referred to as the target device, includes two communication ports. The example communication ports are USB 2.0 ports. The external device, referred to a host device, is communicatively coupled to one of the USB 2.0 ports of the target device via one of its own USB 2.0 ports. The components of the target device and host device are simplified to show the relevant communication port controller devices that enable communication between the devices. One skilled in the art would understand that each device would include other components and that the illustrated components can be a part of a SoC or similarly configured at each device.

The target device 101 in this example is presumed not to have higher level function and the USB host/device controllers 105 that would enable the USB port 121 to communicate with the USB communication port 123 of the host device 103. The USB host/device controllers 105 are implemented after boot-up of the target device 101 for example as part of the operating system. In this case, these USB host/device controllers 105 can therefore not facilitate the operation of the USB port 121. The AHD 113 however can operate from power up of the target device 101 and facilitate some operations of the USB port 121.

The AHD 113 can detect a connection at the USB 2.0 port. The AHD is communicatively coupled to the USB port 121 and can use any mechanism for port connection detection. In one embodiment, the AHD 113 can receive a USB 2.0 port reset signal from any of the USB ports 121 of the target device 101. The AHD can enable the operation of the USB port 121 at power-on, for example, by configuring the port 121 to operate in an Upstream Facing Port (UFP) mode by setting the port with a 1.5 k ohm pullup resistance. This configuration enables the AHD 113 to detect the attachment of the host device 103 as the port 121 will generate a USB reset signal when the connection occurs. The AHD 113 can be implemented as an application specific integrated circuit, as a micro-coded controller, or similarly constructed.

In response to receiving the port connection signal (e.g., the USB 2.0 port reset signal), the AHD can configure a connection interface 109 to enable a debug, diagnostic, characterization controller 107 to communicate with the USB 2.0 port 121 of the target device 101 and thereby to establish a communication session with the host device 103. The connection interface 109 can be any circuitry or similar interface to manage communication between the USB 2.0 ports and operational components like the debug, diagnostic, characterization controller 107 and USB host/device controllers 105. In some embodiments, the connection interface 109 is a set of multiplexors that have input/output configuration driven by the AHD 113. In some embodiments, the combination of the AHD 113 and connection interface 109 can be referred to as a communication port manager 111.

The host 103 can be any type of computing device including a mobile device, desktop, specialized testing device or similar device. The host 103 can include a USB controller 117 that manages the USB port 123 and enables communication via the port. The host 103 can include any number of additional components including a processor, electronic storage, and similar components that enable it to run software including testing and diagnostic software that may communicate with the debug, diagnostic and characterization controller 107 of the target device 101 to enable the host device 103 to perform debugging, testing or diagnostic functions on the target device 101 to determine whether its components are operating properly and to diagnose any issues with the target device 101.

This target device 101 and host device 103 scenario is provided by way of illustration and not limitation. One skilled in the art would understand that the processes and structures described with relation to this example are also applicable to other similar architectures, components and processes.

Figure 2:
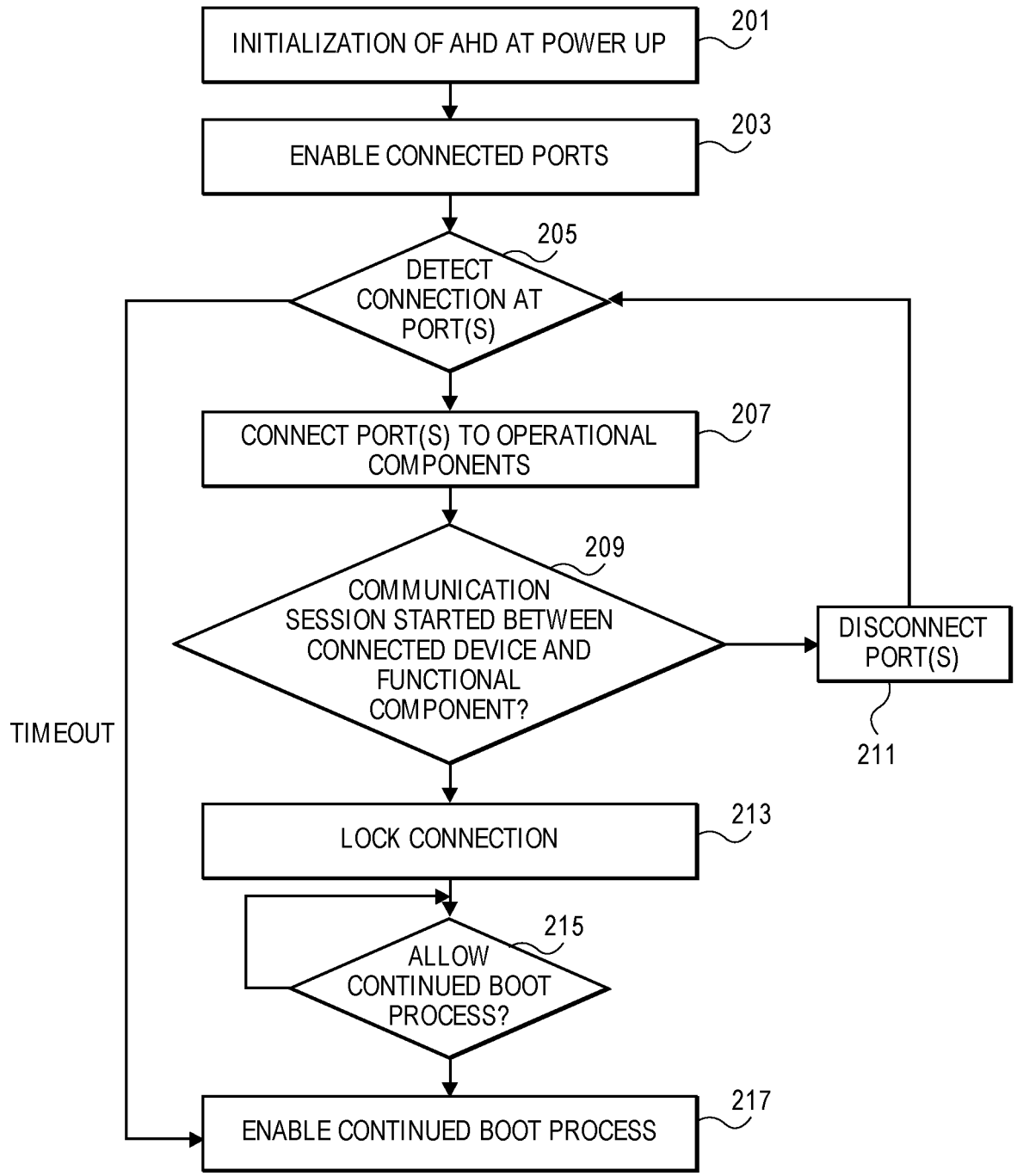
FIG. 2 is a flowchart of one embodiment of process for managing communication ports.

FIG. 2 is a flowchart of one embodiment of process for managing communication ports. The process is applicable to any type of communication port where the functional operation of the communication port relies higher level software controllers such as that provided by the operating system. The process is initiated at the power-up of the device, in particular where the AHD is initialized at power-up (Block 201). The communication port manager including the AHD and communication interface as well as the communication port that is managed by these components can receive power from an internal power source of the device in which they are situated. In other embodiments, these components can receive power via the communication port and the external device attached thereto.

The communication port manager, or more specifically the AHD can be initialized or similarly configured the communication ports of the device (Block 203). The configuration of the communication ports can enable them to detect and signal a connection with another device at the communication port. The communication port manager can configure and enable all of the communication ports in the system or any subset of the available set of communication ports. A 'set,' as used herein, refers to any positive whole number of items including one item. The set of available communication ports can be enabled in any number or combination.

Each enabled communication port is then capable of detecting and signaling to the AHD that a connection has been made with that communication port (Block 205). Connection detection may be timed such that after a given timeout period the device continues with a boot process where the higher-level software environment is loaded by the device (Block 217). If any of the communication ports detect a connection, then the AHD configures the connection interface to establish a line of communication between the communication port that has signaled a connection and the operational components that will service the communication port (Block 207). The operational component can be a debug, diagnostic, characterization component or similar component. Once the connection between the communication port and the operational component is established by the AHD, then the external device and the operational component can establish a communication session using any communication protocol (Block 209). The communication session can be initiated by a handshake process or similar process dependent on the protocol utilized for the communication session. If the communication session is not established, then the communication port can be disconnected from the operational component by the AHD signaling to the connection interface to reconfigure the routing (Block 211). The process can continue to wait for detection of new or additional connections at any of the communication ports (Block 205).

If a communication session is successfully established, then the process can lock the connection between the operational component and the communication port at the connection interface (Block 213). The AHD can detect or be signaled of the successful establishment of a communication session and lock (i.e., block further change) to the configuration of the connection interface that would alter the communication session between the external device and the operational component (Block 213). The process can continue to detect other connections and establish communication between the communication ports and operational components.

In some embodiments, the AHD can determine whether the boot process is allowed to progress to begin execution of higher-level software environments (Block 215). This can be based on the continued operation of a communication session, a timeout or similar criteria. If the boot-up process is not to be started then the process can stay in the locked connection state (Block 213) and/or can continue to check for additional connections at the communication ports (Block 209). If the AHD determines that the boot-up process can continue then the operating system, basic input-output system (BIOS) or similar firmware or software can begin the boot-up process. In some embodiments, the AHD may disconnect the communication port from the operational component when the boot-up process begins.

Figure 3:
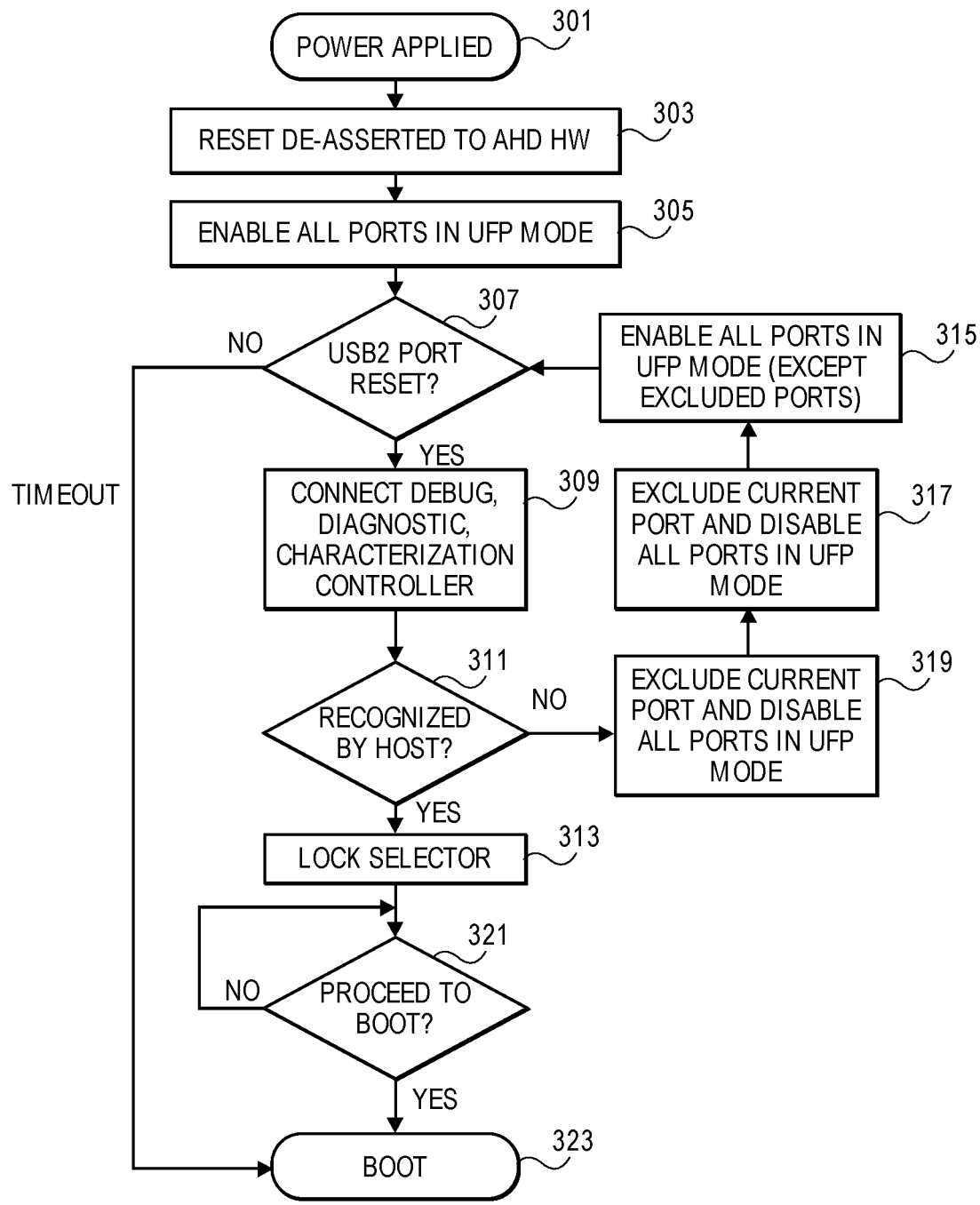
FIG. 3 is a flowchart of another embodiment of a process for managing Universal Serial Bus (USB) ports.

FIG. 3 is a flowchart of another embodiment of a process for managing Universal Serial Bus (USB) ports. This process is an example implementation of the communication port manager operation where the ports are USB 2.0 ports with any type of form factor (A, B, AB or C). As with the general case, the process can be initiated at the power-up of the device, in particular, where the AHD is initialized at power-up (Block 301). The communication port manager including the AHD and communication interface as well as the USB ports that are managed by these components can receive power from an internal power source of the device in which they are situated. In other embodiments, these components can receive power via the communication port and the external device attached thereto according to USB power delivery.

The communication port manager, or more specifically the AHD can initialize the USB ports by de-asserting the USB reset signal (Block 303) and enabling all of the USB ports in a UFP mode (Block 305). The enablement of the USB ports can enable them to detect and signal a connection with another device by asserting a USB 2.0 port reset signal. The communication port manager can configure and enable all of the USB ports in the system or any subset of the available set of USB ports.

Each enabled USB port is then capable of asserting the reset signal which is detected by the AHD when a connection has been made with that USB port (Block 307). The process of waiting for a USB reset signal may be timed such that after a given timeout period the device continues with a boot process where the higher-level software environment is loaded by the device (Block 323). In response to the reset signal, the AHD configures the connection interface to connect a debug, diagnostic, characterization controller to the USB port that generated the reset signal (Block 309). Once the connection between the USB port and the debug, diagnostic, characterization controller is created then a check is made whether the external device (i.e., the USB host) recognizes the connection (Block 311). Where the USB host recognizes the connection, the AHD locks the selection of the connection interface (Block 313). In some embodiments, the process allows multiple physical host connections to be made and can exclude ports to determine which port is connected to the correct host through a process of trial and elimination. A debug, diagnostic and characterization host connection may be inferred by the successful enumeration of the associated controller (i.e., a configured USB 2.0 device state). Once a debug, diagnostic and characterization host is successfully detected, the mux selection is locked to avoid functional flows from interfering with the session. In the event no debug, diagnostic and characterization host is detected, a timeout is defined so the boot process for the SoC and platform can proceed.

If the USB host does not recognize the connection, then the AHD disconnects the debug, diagnostic, characterization controller (Block 319), excludes the USB port and disables all USB ports in the UFP mode (Block 317). The AHD then enables all of the USB ports in UFP mode except the excluded ports (Block 315). The AHD then continues to wait for further USB reset signals to be raised.

If the USB host recognized the connection and the AHD locked the connection selection (Block 313), then the AHD determines whether to proceed to a system boot (Block 321). This can be based on the continued operation of a communication session, a timeout or similar criteria. If the boot-up process is not to be started then the process can stay in the locked connection state (Block 313). If the AHD determines that the boot-up process can continue then the operating system, basic input-output system (BIOS) or similar firmware or software can begin the boot-up process (Block 323).

Figure 4:
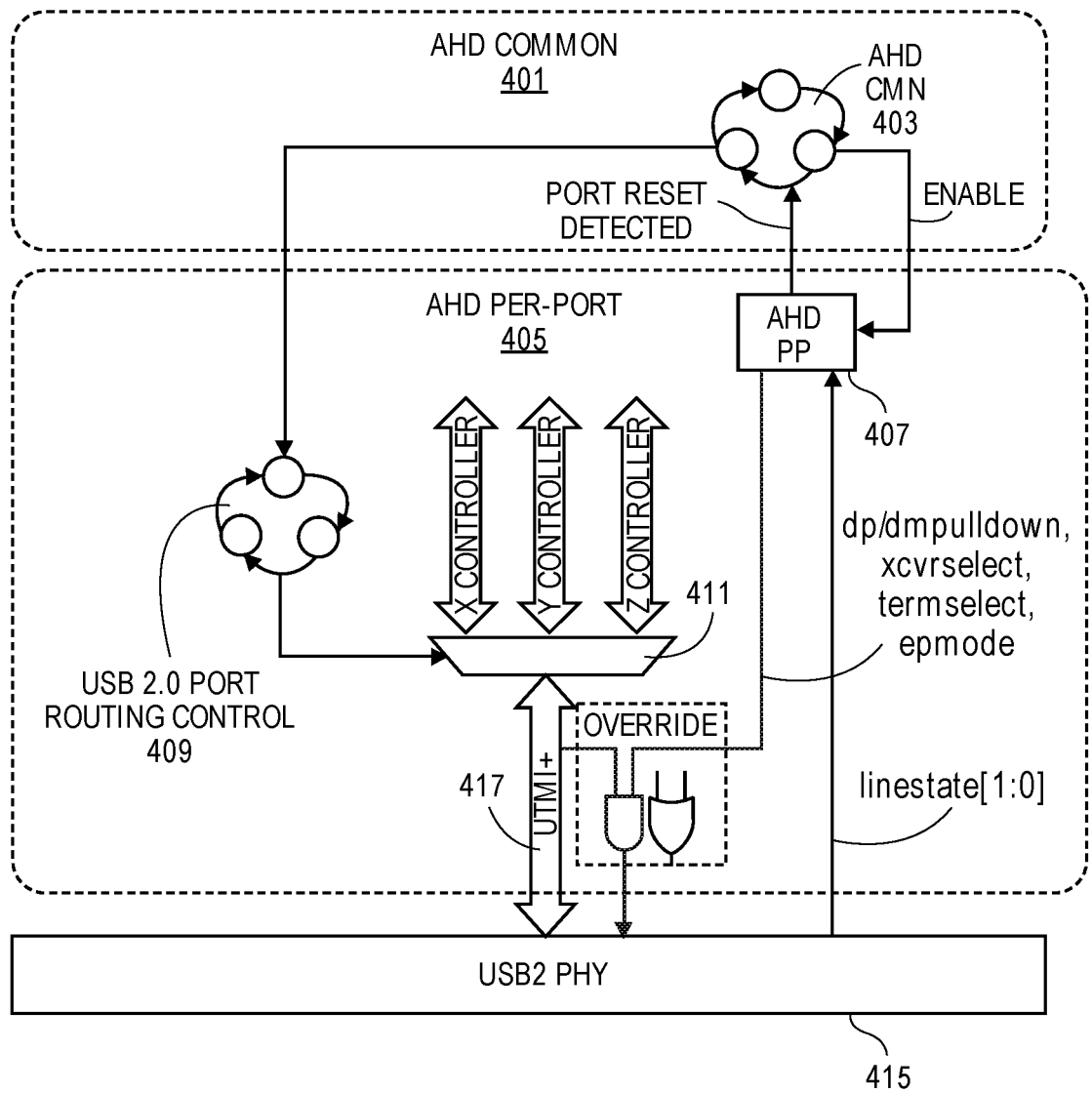
FIG. 4 is a diagram of one embodiment of an autonomous host detection (AHD) component.

FIG. 4 is a diagram of one embodiment of an autonomous host detection (AHD) components. These components may be considered micro-architectural components of the AHD. In some embodiments, the functionality of the AHD may be divided between the common (AHD common 401) and per-per (AHD per-port 405) functions. The AHD components are powered up and reset or initialized at system start. The AHD per-port (AHD PP) logic 407 is enabled by the AHD common (AHD CMN) logic 403. The AHD PP logic 407 will override 413 the functional USB 2.0 transceiver macrocell interface (UTMI) or UTMI+ signals 417 to the USB 2.0 physical layer 415 to signal a connection to a host that maybe attached. The AHD PP logic 407 will then continuously monitor the lines states from the UTMI+ based USB 2.0 physical layer a USB 2.0 port reset event that will indicate a connection with an external device.

Once a USB 2.0 port reset is reliably detected by the AHD PP 407, it will signal to the AHD CMN logic 403. The AHD CMN logic 403 will proceed to instruct USB 2.0 port routing control 409 to change the multiplexor selector for the connection interface 411 to the debug, diagnostic and characterization controller or similar controller for enumeration. If enumeration is successful, the selector for the multiplexor 411 is locked and the boot process continues. Otherwise, the process will disconnect and exclude this port, and will retry the connect signaling to all other ports, until a timeout occurs. Once timed out, the boot process can continue without a debug session.

The AHD and related components may be a part of the USB controllers that are utilized to manage the USB ports in a system. The principles of the AHD are also applicable to similar types of ports and port management components. These ports are communication ports that are primarily utilized to communicatively coupled one device to another, while also providing communication options in some cases for debugging, testing and diagnostic functions. In certain embodiments, a first device may connect to a second device through such communication ports that may be any type of a (e.g., wired) electrical connection, for example, a serial bus cable having multiple conductors (e.g., wires). A cable may include a plug, e.g., on each end thereof. A receptacle of a device (or a plug of a device) may receive a plug (or receptacle) coupled to another device. In one embodiment, a plug may be received (e.g., inserted) into a receptacle in a plurality of orientations, for example, flipped from one orientation to another orientation, e.g., and retain its (e.g., full) functions. This may be referred to as "flip-ability", e.g., flip-able between a right-side up position and an upside-down position.

Certain embodiments (for example, with one or more flip-able plug and receptacle pairs) may allow a first device and/or a second device to toggle between different roles, for example, as the devices wait for a physical connection to be made and each device's role to be established, e.g., in contrast to a connector's type defining a role, such as a type-A USB connector being a host (data master) role and a type-B USB connector being a slave (data recipient) role. In certain embodiments herein, a first device may be in a first role (e.g., an upstream facing data port role, downstream facing data port role, power source role, and/or power sink role) and a second device in a second (e.g., same or different than the first) role (e.g., an upstream facing data port role, downstream facing data port role, power source role, and/or power sink role). In one embodiment, a device (e.g., a circuit thereof) presents itself (e.g., during initial attachment) as a first of a plurality of roles, then changes to a second of a plurality of roles, etc. In one embodiment, a device (e.g., a circuit thereof) presents itself (e.g., during initial attachment) as a first role, then toggles to a second role, then back to the first role, for example, and continues to do so, e.g., until the other device acknowledges that role (e.g., via an acknowledgement signal). For example, a current USB Type-C specification (e.g., revision 1.2 of Mar. 25, 2016) and a current USB Power Delivery specification (e.g., revision 3.0, version 1.0a of Aug. 2, 2016) includes an upstream facing data port role (e.g., a host) and a downstream facing data port role for each device (e.g., a USB device) and/or a power source role and a power sink role. In one embodiment, a device in the power source role (e.g., that acquires the power source role) is also in the downstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles). In one embodiment, a device in the power sink role (e.g., that acquires the power sink role) is also in the upstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles).

In certain embodiments, a first device with multiple (e.g., dual) roles may connect to a second device with multiple (e.g., dual) roles (for example, where each device's role is not defined by the connector (e.g., a plug or receptacle thereof) type, e.g., two devices connected by a cable that has the same plug at each end). In embodiments, each device may present itself in the same role, for example, where the devices do not connect to each other, e.g., do not connect from a user's perspective or with respect to a communication protocol (for example, electrically and/or physically connected devices that do not allow data and/or power transmission or reception, e.g., other than communications to define a device's role). Certain devices (e.g., operating according to specification(s) or industry standards) do not have predefined roles, for example, each device is to establish its role, for example, or it does not function, e.g., to transmit and receive data and/or source and sink power. Certain devices (e.g., operating according to specification(s) or industry standards) do not define device role(s), for example, in the point-to-point connection by the connector type, e.g., to accept and provide power and/or data with an externally connected device (e.g., a laptop connected to phone, a laptop connected to an external (e.g., USB drive), a phone connected to tablet, etc.).

For example, each device of a plurality of devices may include a same connector (e.g., plug or receptacle thereof), for example, such that circuitry is to cause signaling (e.g., between connected devices) while the connections are physically made (e.g., during an initialization phase) in order to define the role(s) of each device, for example, one device as a host and another device as a slave and/or one device as a power source (e.g., provider) and another device as the power sink (e.g., consumer). In certain embodiments, devices that toggle (e.g., switch) between either of a plurality of roles (e.g., a dual role device) are to toggle (e.g., via a toggling circuit) back and forth between a plurality of roles, for example, (e.g., only) between an upstream facing data port role (e.g., slave or device role) and a downstream facing data port role (e.g., host role). Device(s) may toggle between a plurality of roles until a specific (e.g., stable) state is established, for example, during a connection process (e.g., initial attach). A multiple (e.g., dual) role device may connect to a fixed role device or another multiple (e.g., dual) role device. In one embodiment, both devices are capable of the same (e.g., pair of) roles. In one embodiment, both multiple (e.g., dual) role devices (e.g., the ports thereof) are toggling between a first role and a second role (for example, via one or more of each device's configuration channels (e.g., each device's CC1 and CC2 pins)) at (e.g., substantially) the same frequency (e.g., time rate) and/or duty cycle. Thus, in certain embodiments, a physical connection is made (e.g., with a USB Type-C cable) between two or more multiple role devices but none of the devices detects the signaling to define a role (e.g., no device detects a signaling event or sends a response to acknowledge the signaling event).

Certain embodiments herein provide for a randomization of one or both of multiple role device's toggling frequency and its toggling duty cycle, for example, to minimize the probability of in sync toggling. Certain embodiments herein provide for a randomization of one or both of multiple role device's toggling frequency and its duty cycle during each cycle of toggling between different device roles. Certain embodiments herein randomize a multiple (e.g., dual) role device's toggling frequency and duty cycle, e.g., to vary the high and low times of the toggling, to reduce or eliminate the possibility of two (e.g., unique) separate devices having the same timings, e.g., over a plurality of cycles. Certain embodiments herein provide for one or more multiple (e.g., dual) role devices connected together to resolve their upstream facing data port role and downstream facing data port role and/or their power source role and power sink role faster than without randomization, e.g., as the likelihood all (e.g., both) devices are asserting (e.g., displaying) the same role at the same time is reduced (e.g., lower) or eliminated. Certain embodiments herein add more randomization to the toggling frequency and/or duty cycle of a device asserting each role indicator than a device with a fixed duty cycle and/or frequency of toggling, e.g., more randomization than a substantially fixed toggling duty cycle and/or a substantially fixed frequency of toggling that rely only on the inaccuracy (e.g., according to manufacturing tolerances) of internal timers or oscillators to provide variance (e.g., misalignment) to resolve roles and avoid the case where the toggling is in sync. Certain embodiments herein reduce role resolution times as well as reduce or avoid any occurrences where neither device sees the role defining event (e.g., a cable and/or plug insertion event). Certain embodiments herein reduce (e.g., to the end user) the resolution time significantly, e.g., the overall time from connection of the devices to usability (e.g., to allow payload data to be transmitted and received, e.g., and not role merely role resolution data transmission and receipt) is shorter.

Figure 5:
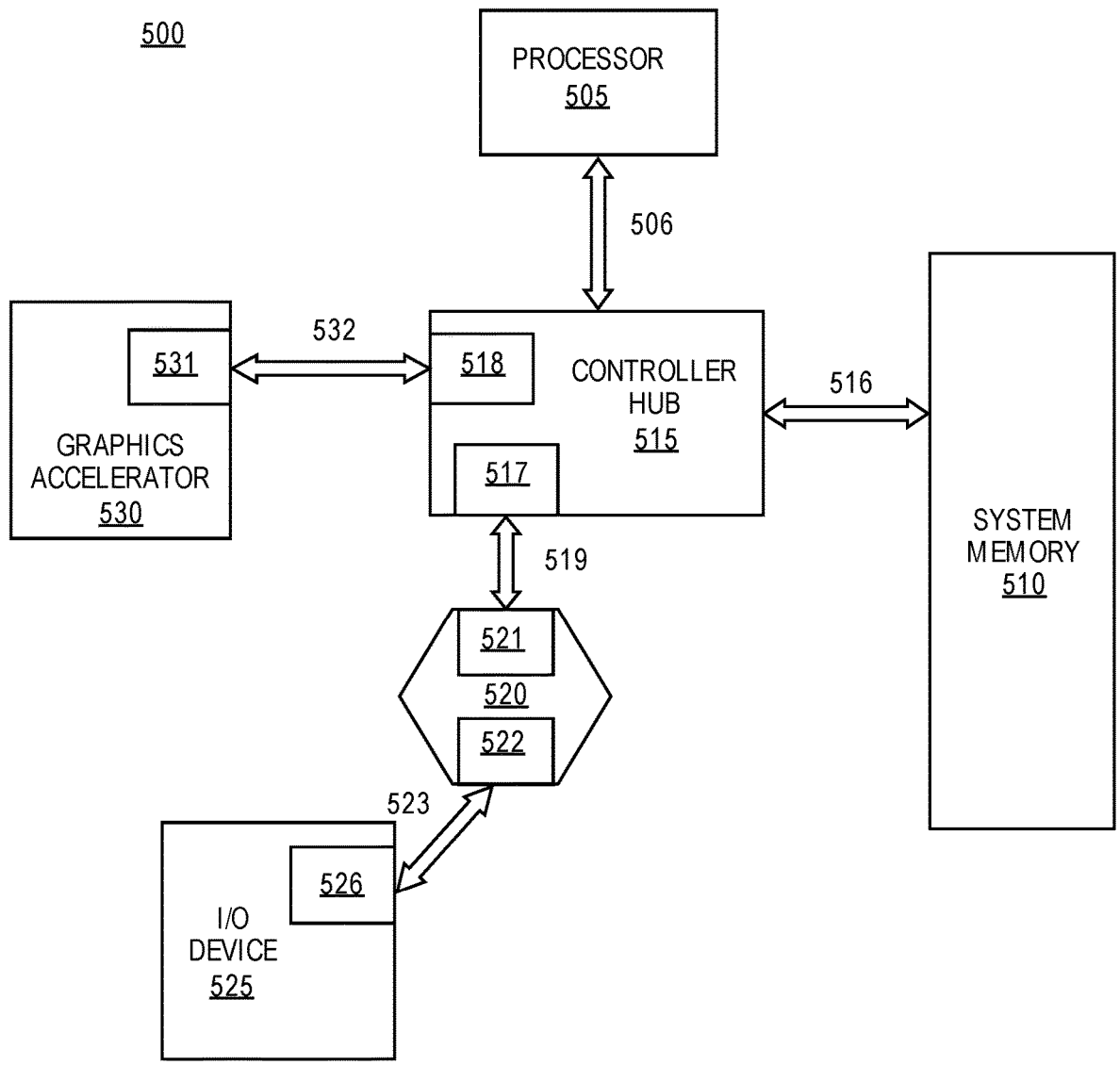
FIG. 5 illustrates a computing system including a peripheral component interconnect express (PCIe) compliant architecture according to embodiments of the disclosure.

Referring to FIG. 5, an embodiment of a fabric composed of point-to-point Links that interconnect a set of components is illustrated. System 500 includes processor 505 and system memory 510 coupled to controller hub 515. Processor 505 includes any processing element, such as a microprocessor, a host processor, an embedded processor, a co-processor, or other processor. Processor 505 is coupled to controller hub 515 through front-side bus (FSB) 506. In one embodiment, FSB 506 is a serial point-to-point interconnect as described below. In another embodiment, link 506 includes a serial, differential interconnect architecture that is compliant with different interconnect standard.

System memory 510 includes any memory device, such as random-access memory (RAM), non-volatile (NV) memory, or other memory accessible by devices in system 500. System memory 510 is coupled to controller hub 515 through memory interface 516. Examples of a memory interface include a double-data rate (DDR) memory interface, a dual-channel DDR memory interface, and a dynamic RAM (DRAM) memory interface.

In one embodiment, controller hub 515 is a root hub, root complex, or root controller in a Peripheral Component Interconnect Express (PCIe or PCIE) interconnection hierarchy. Examples of controller hub 515 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 505, while controller 515 is to communicate with I/O devices, in a similar manner as described below. In some embodiments, peer-to-peer routing is optionally supported through root complex 515.

Here, controller hub 515 is coupled to switch/bridge 520 through serial link 519. Input/output modules 517 and 521, which may also be referred to as interfaces/ports 517 and 521, include/implement a layered protocol stack to provide communication between controller hub 515 and switch 520. In one embodiment, multiple devices are capable of being coupled to switch 520.

Switch/bridge 520 routes packets/messages from device 525 upstream, e.g., up a hierarchy towards a root complex, to controller hub 515 and downstream, e.g., down a hierarchy away from a root controller, from processor 505 or system memory 510 to device 525. Switch 520, in one embodiment, is referred to as a logical assembly of multiple virtual PCI-to-PCI bridge devices. Device 525 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 525 may include a PCIe to PCI/PCI-X bridge to support legacy or other version PCI devices. Endpoint devices in PCIe are often classified as legacy, PCIe, or root complex integrated endpoints.

Graphics accelerator 530 is also coupled to controller hub 515 through serial link 532. In one embodiment, graphics accelerator 530 is coupled to an MCH, which is coupled to an ICH. Switch 520, and accordingly to I/O device 525 through serial link 523, is then coupled to the ICH. I/O modules 531 and 518 are also to implement a layered protocol stack to communicate between graphics accelerator 530 and controller hub 515. Similar to the MCH discussion above, a graphics controller or the graphics accelerator 530 itself may be integrated in processor 505.

Figure 6:
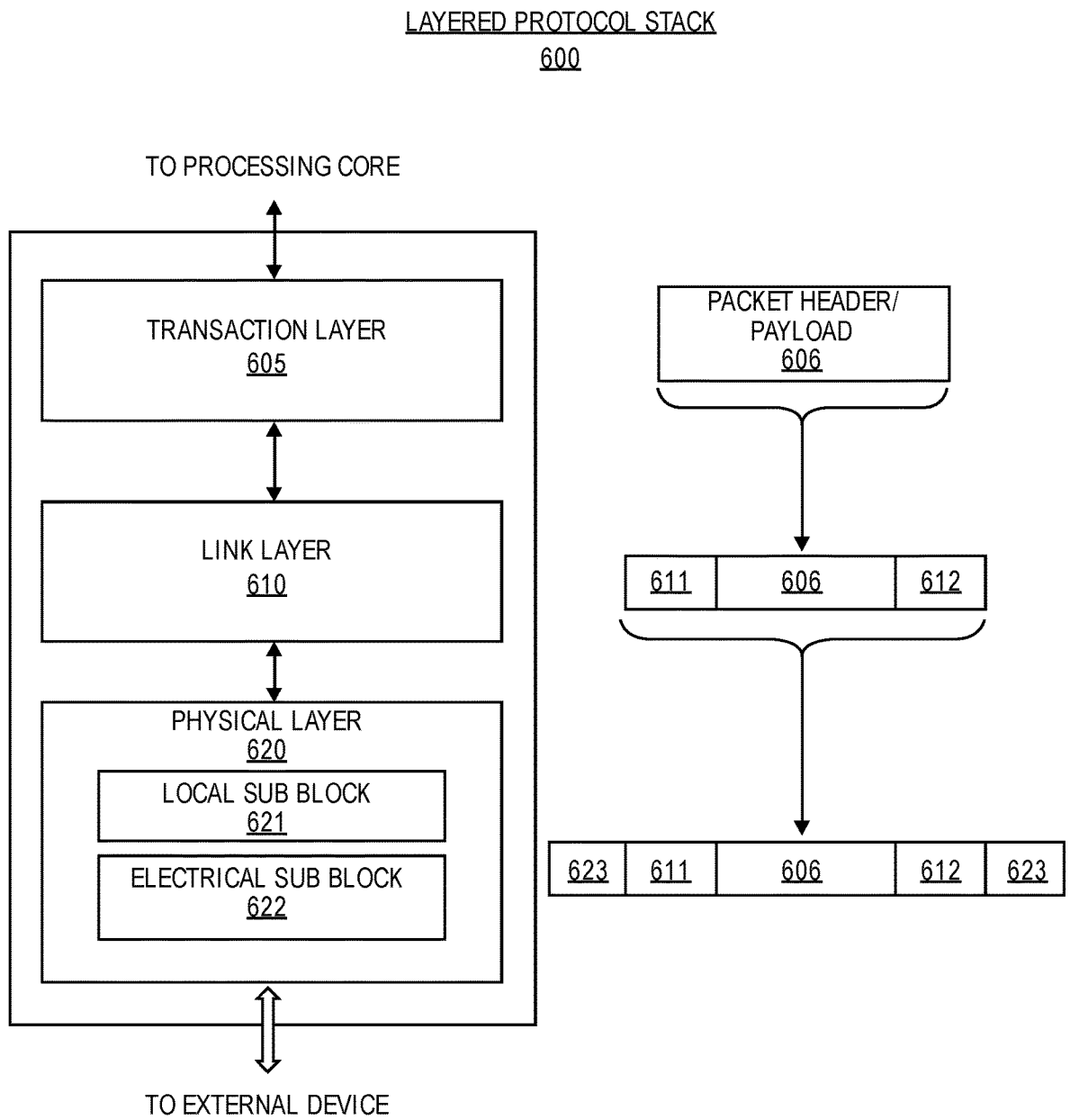
FIG. 6 illustrates a PCIe compliant interconnect architecture including a layered stack according to embodiments of the disclosure.

Turning to FIG. 6 an embodiment of a layered protocol stack is illustrated. Layered protocol stack 600 includes any form of a layered communication stack, such as a Quick Path Interconnect (QPI) stack, a PCIe stack, a next generation high performance computing interconnect stack, or other layered stack. Although the discussion immediately below in reference to FIGS. 5-8 are in relation to a PCIe stack, the same concepts may be applied to other interconnect stacks. In one embodiment, protocol stack 600 is a PCIe protocol stack including transaction layer 605, link layer 610, and physical layer 620. An interface, such as interfaces 517, 518, 521, 522, 526, and 531 in FIG. 5, may be represented as communication protocol stack 600. Representation as a communication protocol stack may also be referred to as a module or interface implementing/including a protocol stack.

PCI Express uses packets to communicate information between components. Packets are formed in the Transaction Layer 605 and Data Link Layer 610 to carry the information from the transmitting component to the receiving component. As the transmitted packets flow through the other layers, they are extended with additional information necessary to handle packets at those layers. At the receiving side the reverse process occurs and packets get transformed from their Physical Layer 620 representation to the Data Link Layer 610 representation and finally (for Transaction Layer Packets) to the form that can be processed by the Transaction Layer 605 of the receiving device.

Transaction Layer

In one embodiment, transaction layer 605 is to provide an interface between a device's processing core and the interconnect architecture, such as data link layer 610 and physical layer 620. In this regard, a primary responsibility of the transaction layer 605 is the assembly and disassembly of packets (e.g., transaction layer packets, or TLPs). The translation layer 605 typically manages credit-base flow control for TLPs. PCIe implements split transactions, e.g., transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 605. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 605 assembles packet header/payload 606. Format for current packet headers/payloads may be found in the PCIe specification at the PCIe specification website.

Figure 7:
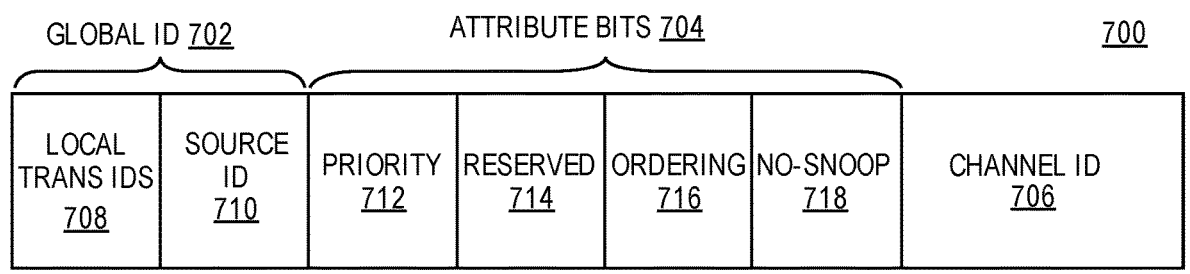
FIG. 7 illustrates a PCIe compliant request or packet to be generated or received within an interconnect architecture according to embodiments of the disclosure.

Referring to FIG. 7, an embodiment of a PCIe transaction descriptor is illustrated. In one embodiment, transaction descriptor 700 is a mechanism for carrying transaction information. In this regard, transaction descriptor 700 supports identification of transactions in a system. Other potential uses include tracking modifications of default transaction ordering and association of transaction with channels.

Transaction descriptor 700 includes global identifier field 702, attributes field 704 and channel identifier field 706. In the illustrated example, global identifier field 702 is depicted comprising local transaction identifier field 708 and source identifier field 710. In one embodiment, global transaction identifier 702 is unique for all outstanding requests.

According to one implementation, local transaction identifier field 708 is a field generated by a requesting agent, and it is unique for all outstanding requests that require a completion for that requesting agent. Furthermore, in this example, source identifier 710 uniquely identifies the requestor agent within a PCIe hierarchy. Accordingly, together with source ID 710, local transaction identifier 708 field provides global identification of a transaction within a hierarchy domain.

Attributes field 704 specifies characteristics and relationships of the transaction. In this regard, attributes field 704 is potentially used to provide additional information that allows modification of the default handling of transactions. In one embodiment, attributes field 704 includes priority field 712, reserved field 714, ordering field 716, and no-snoop field 718. Here, priority sub-field 712 may be modified by an initiator to assign a priority to the transaction. Reserved attribute field 714 is left reserved for future, or vendor-defined usage. Possible usage models using priority or security attributes may be implemented using the reserved attribute field.

In this example, ordering attribute field 716 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 718 is utilized to determine if transactions are snooped. As shown, channel ID Field 706 identifies a channel that a transaction is associated with.

Link Layer

Link layer 610, also referred to as data link layer 610, acts as an intermediate stage between transaction layer 605 and the physical layer 620. In one embodiment, a responsibility of the data link layer 610 is providing a reliable mechanism for exchanging Transaction Layer Packets (TLPs) between two components a link. One side of the Data Link Layer 610 accepts TLPs assembled by the Transaction Layer 605, applies packet sequence identifier 611, e.g., an identification number or packet number, calculates and applies an error detection code, e.g., CRC 612, and submits the modified TLPs to the Physical Layer 620 for transmission across a physical to an external device.

Physical Layer

In one embodiment, physical layer 620 includes logical sub block 621 and electrical sub-block 622 to physically transmit a packet on an external device. Here, logical sub-block 621 is responsible for the "digital" functions of Physical Layer 621. In this regard, the logical sub-block includes a transmit section to prepare outgoing information for transmission by physical sub-block 622, and a receiver section to identify and prepare received information before passing it to the Link Layer 610.

Physical block 622 includes a transmitter and a receiver. The transmitter is supplied by logical sub-block 621 with symbols, which the transmitter serializes and transmits onto to an external device. The receiver is supplied with serialized symbols from an external device and transforms the received signals into a bit-stream. The bit-stream is de-serialized and supplied to logical sub-block 621. In one embodiment, an 8b/10b transmission code is employed, where ten-bit symbols are transmitted/received. Here, special symbols are used to frame a packet with frames 623. In addition, in one example, the receiver also provides a symbol clock recovered from the incoming serial stream.

As stated above, although transaction layer 605, link layer 610, and physical layer 620 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, e.g., a transaction layer; a second layer to sequence packets, e.g., a link layer; and a third layer to transmit the packets, e.g., a physical layer. As a specific example, a common standard interface (CSI) layered protocol is utilized.

Figure 8:
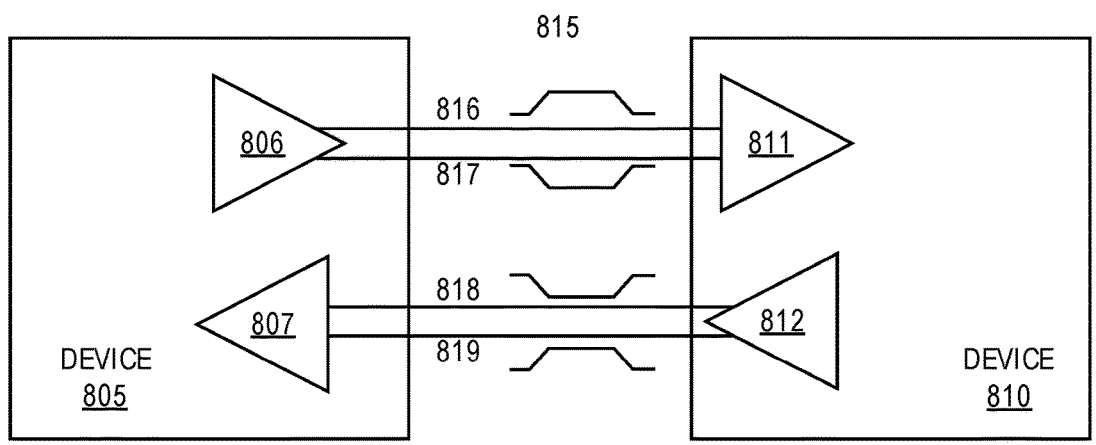
FIG. 8 illustrates a transmitter and receiver pair for a PCIe compliant interconnect architecture according to embodiments of the disclosure.

Referring next to FIG. 8, an embodiment of a PCIe serial point to point fabric 800 is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 806/811 and a receive pair 812/807. Accordingly, device 805 includes transmission logic 806 to transmit data to device 810 and receiving logic 807 to receive data from device 810. In other words, two transmitting paths, e.g., paths 816 and 817, and two receiving paths, e.g., paths 818 and 819, are included in a PCIe link.

A transmission path refers to any path for transmitting data, such as a transmission line, a copper line, an optical line, a wireless communication channel, an infrared communication link, or other communication path. A connection between two devices, such as device 805 and device 810, is referred to as a link, such as link 815. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 816 and 817, to transmit differential signals. As an example, when line 816 toggles from a low voltage level to a high voltage level, e.g., a rising edge, line 817 drives from a high logic level to a low logic level, e.g., a falling edge. Differential signals potentially demonstrate better electrical characteristics, such as better signal integrity, e.g., cross-coupling, voltage overshoot/undershoot, ringing, etc. This allows for better timing window, which enables faster transmission frequencies.

Figure 9:
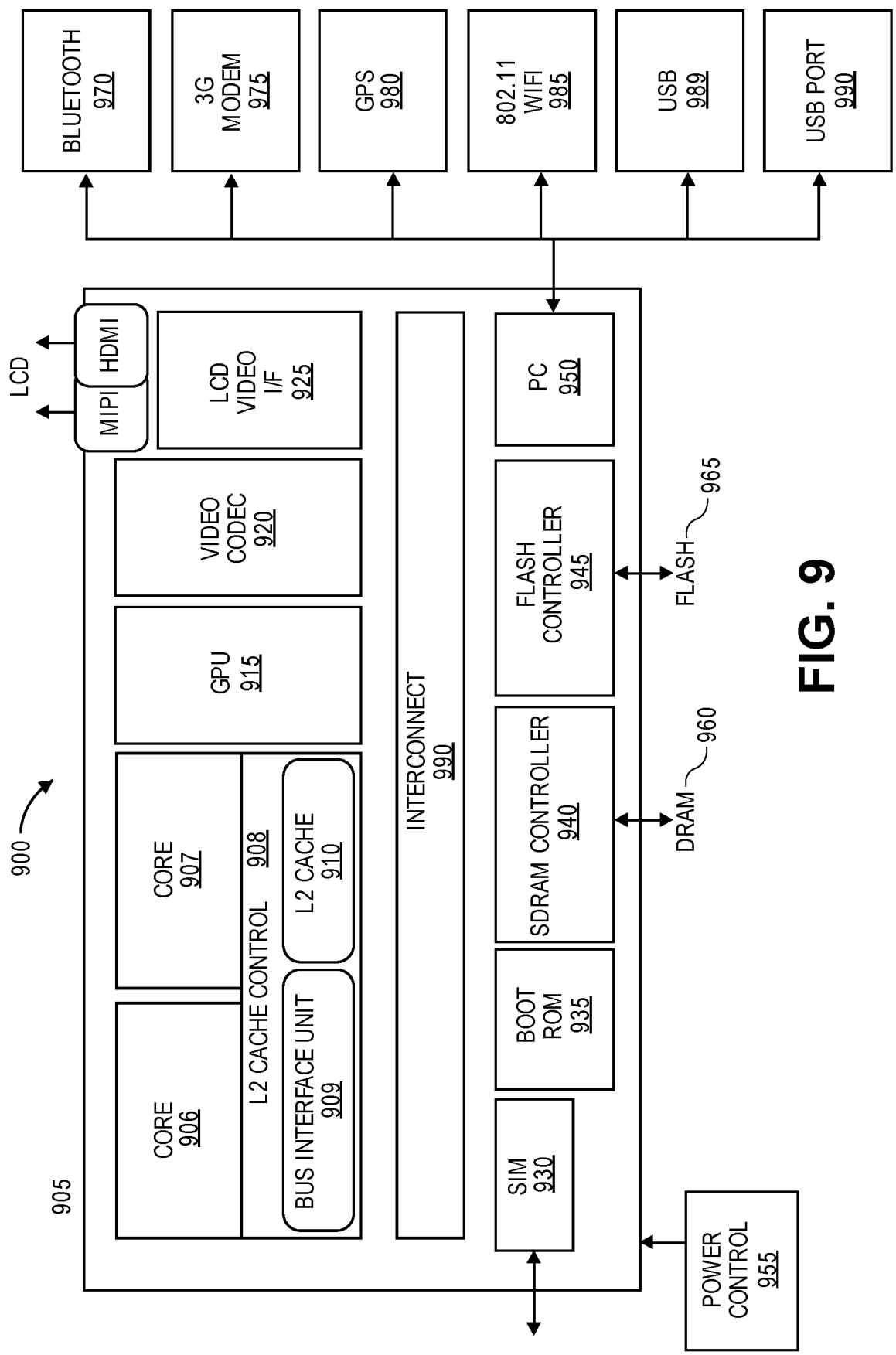
FIG. 9 illustrates a computing system on a chip according to embodiments of the disclosure.

Turning next to FIG. 9, an embodiment of a system on-chip (SOC) design in accordance with the embodiments is depicted. As a specific illustrative example, SOC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 900 includes 2 cores—906 and 907. Similar to the discussion above, cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 990 includes an on-chip interconnect, such as an IOSF, AMBA, or other interconnect discussed above, which potentially implements one or more aspects of the described embodiments.

Interconnect 990 provides communication channels to the other components, such as a Subscriber Identity Module (SIM) 930 to interface with a SIM card, a boot ROM 935 to hold boot code for execution by cores 906 and 907 to initialize and boot SOC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the embodiments described herein. In some embodiments, the AHD and similar components can be part of a peripheral control 950 or similar components that interface with a USB port 990 or set of such ports.

In addition, the system illustrates peripherals for communication, such as a Bluetooth module 970, 3G modem 975, GPS 980, USB port 990 and Wi-Fi 985. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 10:
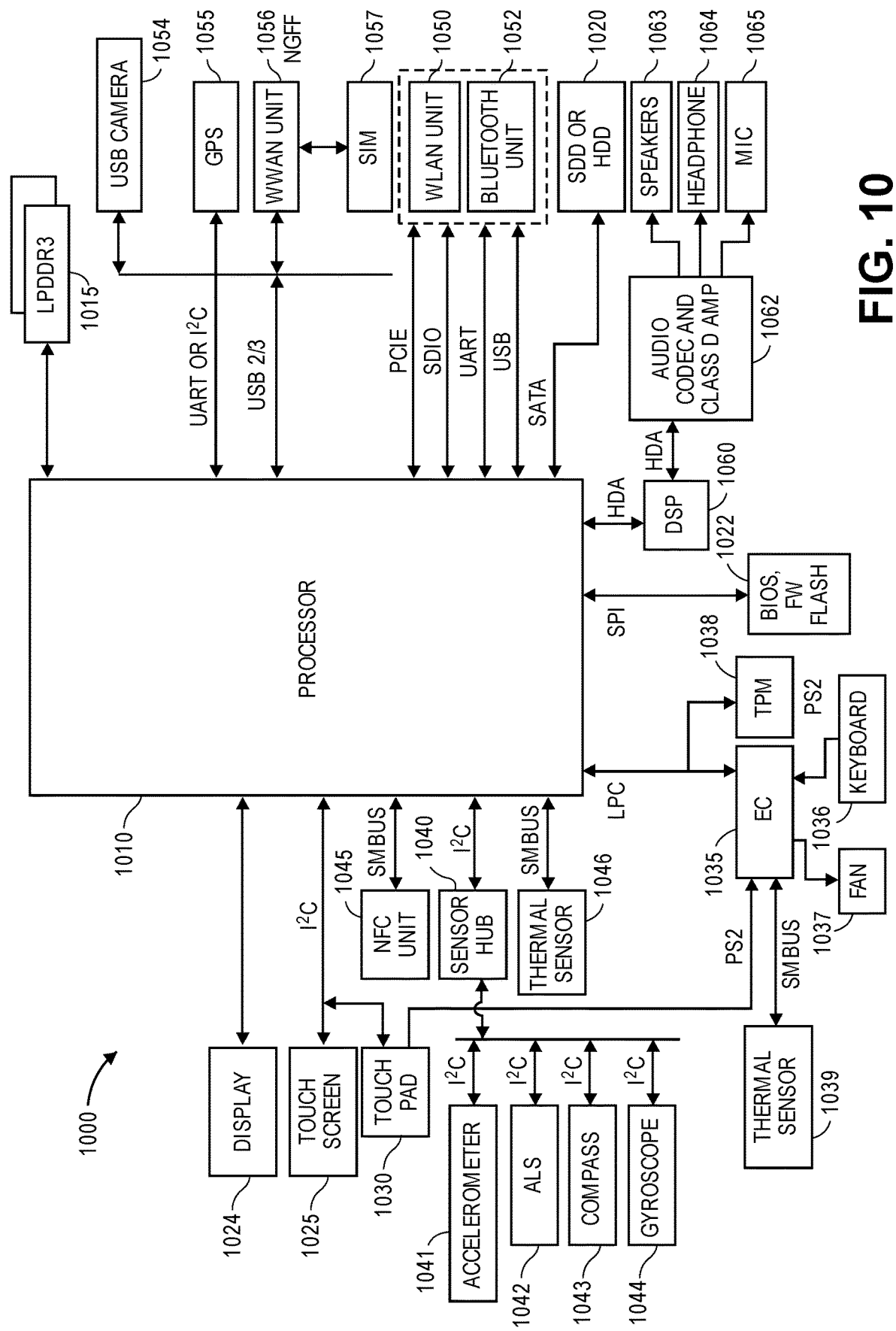
FIG. 10 illustrates an embodiment of a block diagram for a computing system.

Referring now to FIG. 10, a block diagram of components present in a computer system in accordance with embodiments of the disclosure is illustrated. As shown in FIG. 10, system 1000 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 10 is intended to show a high level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 10, a processor 1010, in one embodiment, includes a microprocessor, multi-core processor, multi-threaded processor, an ultra-low voltage processor, an embedded processor, or other known processing element. In the illustrated implementation, processor 1010 acts as a main processing unit and central hub for communication with many of the various components of the system 1000. As one example, processor 1010 is implemented as a system on a chip (SoC). As a specific illustrative example, processor 1010 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1010 in one implementation will be discussed further below to provide an illustrative example.

Processor 1010, in one embodiment, communicates with a system memory 1015. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2011), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1020 may also couple to processor 1010. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 10, a flash device 1022 may be coupled to processor 1010, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1000. Specifically shown in the embodiment of FIG. 10 is a display 1024 which may be a high definition LCD or LED panel configured within a lid portion of the chassis. This display panel may also provide for a touch screen 1025, e.g., adapted externally over the display panel such that via a user's interaction with this touch screen, user inputs can be provided to the system to enable desired operations, e.g., with regard to the display of information, accessing of information and so forth. In one embodiment, display 1024 may be coupled to processor 1010 via a display interconnect that can be implemented as a high performance graphics interconnect. Touch screen 1025 may be coupled to processor 1010 via another interconnect, which in an embodiment can be an I$^2$C interconnect. As further shown in FIG. 10, in addition to touch screen 1025, user input by way of touch can also occur via a touch pad 1030 which may be configured within the chassis and may also be coupled to the same I$^2$C interconnect as touch screen 1025.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1010 in different manners. Certain inertial and environmental sensors may couple to processor 1010 through a sensor hub 1040, e.g., via an I$^2$C interconnect. In the embodiment shown in FIG. 10, these sensors may include an accelerometer 1041, an ambient light sensor (ALS) 1042, a compass 1043 and a gyroscope 1044. Other environmental sensors may include one or more thermal sensors 1046 which in some embodiments couple to processor 1010 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra-idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 10, various peripheral devices may couple to processor 1010 via a low pin count (LPC) interconnect. In the embodiment shown, various components can be coupled through an embedded controller (EC) 1035. Such components can include a keyboard 1036 (e.g., coupled via a PS2 interface), a fan 1037, and a thermal sensor 1039. In some embodiments, touch pad 1030 may also couple to EC 1035 via a PS2 interface. In addition, a security processor such as a trusted platform module (TPM) 1038 in accordance with the Trusted Computing Group (TCG) TPM Specification Version 1.2, dated Oct. 2, 2003, may also couple to processor 1010 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. The USB ports and controllers can be configured as described herein above. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1000 can communicate with external devices in a variety of manners, including wirelessly. In the embodiment shown in FIG. 10, various wireless modules, each of which can correspond to a radio configured for a particular wireless communication protocol, are present. One manner for wireless communication in a short range such as a near field may be via a near field communication (NFC) unit 1045 which may communicate, in one embodiment with processor 1010 via an SMBus. Note that via this NFC unit 1045, devices in close proximity to each other can communicate. For example, a user can enable system 1000 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 10, additional wireless units can include other short range wireless engines including a WLAN unit 1050 and a Bluetooth unit 1052. Using WLAN unit 1050, Wi-Fi™ communications in accordance with a given Institute of Electrical and Electronics Engineers (IEEE) 802.11 standard can be realized, while via Bluetooth unit 1052, short range communications via a Bluetooth protocol can occur. These units may communicate with processor 1010 via, e.g., a USB link or a universal asynchronous receiver transmitter (UART) link. Or these units may couple to processor 1010 via an interconnect according to a Peripheral Component Interconnect Express™ (PCIe™) protocol, e.g., in accordance with the PCI Express™ Specification Base Specification version 3.0 (published Nov. 10, 2010), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1056 which in turn may couple to a subscriber identity module (SIM) 1057. In addition, to enable receipt and use of location information, a GPS module 1055 may also be present. Note that in the embodiment shown in FIG. 10, WWAN unit 1056 and an integrated capture device such as a camera module 1054 may communicate via a given USB protocol, e.g., USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1060, which may couple to processor 1010 via a high definition audio (HDA) link. Similarly, DSP 1060 may communicate with an integrated coder/decoder (CODEC) and amplifier 1062 that in turn may couple to output speakers 1063 which may be implemented within the chassis. Similarly, amplifier and CODEC 1062 can be coupled to receive audio inputs from a microphone 1065 which in an embodiment can be implemented via dual array microphones (such as a digital microphone array) to provide for high quality audio inputs to enable voice-activated control of various operations within the system. Note also that audio outputs can be provided from amplifier/CODEC 1062 to a headphone jack 1064. Although shown with these particular components in the embodiment of FIG. 10, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1010 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1035. This sustain power plane also powers an on-die voltage regulator that supports the onboard SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1635 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 7, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C.). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 11:
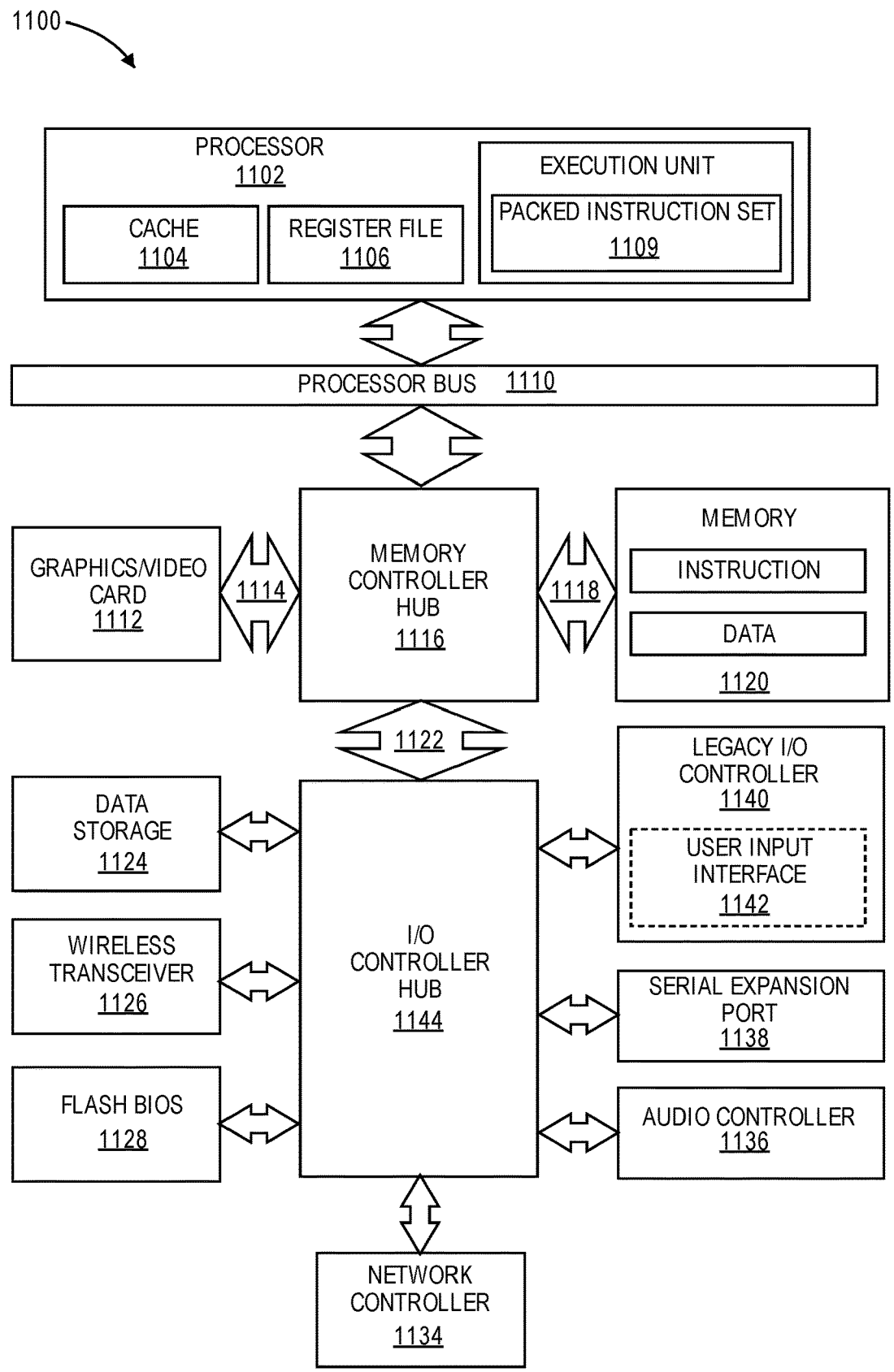
FIG. 11 illustrates another embodiment of a block diagram for a computing system.

Turning to FIG. 11, a block diagram of an exemplary computer system formed with a processor that includes execution units to execute an instruction, where one or more of the interconnects implement one or more features in accordance with embodiments of the disclosure is illustrated. System 1100 includes a component, such as a processor 1102 to employ execution units including logic to perform algorithms for process data, in accordance with the present disclosure, such as in the embodiment described herein. System 1100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1102 includes one or more execution units 1108 to implement an algorithm that is to perform at least one instruction. One embodiment may be described in the context of a single processor desktop or server system, but alternative embodiments may be included in a multiprocessor system. System 1100 is an example of a 'hub' system architecture. The computer system 1100 includes a processor 1102 to process data signals. The processor 1102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1102 is coupled to a processor bus 1110 that transmits data signals between the processor 1102 and other components in the system 1100. The elements of system 1100 (e.g. graphics accelerator 1112, memory controller hub 1116, memory 1120, I/O controller hub 1144, wireless transceiver 1126, Flash BIOS 1128, Network controller 1134, Audio controller 1136, Serial expansion port 1138, I/O controller 1140, etc.) perform their conventional functions that are well known to those familiar with the art.

In one embodiment, the processor 1102 includes a Level 1 (L1) internal cache memory 1104. Depending on the architecture, the processor 1102 may have a single internal cache or multiple levels of internal caches. Other embodiments include a combination of both internal and external caches depending on the particular implementation and needs. Register file 1106 is to store different types of data in various registers including integer registers, floating point registers, vector registers, banked registers, shadow registers, checkpoint registers, status registers, and instruction pointer register.

Execution unit 1108, including logic to perform integer and floating point operations, also resides in the processor 1102. The processor 1102, in one embodiment, includes a microcode (μcode) ROM to store microcode, which when executed, is to perform algorithms for certain macroinstructions or handle complex scenarios. Here, microcode is potentially updateable to handle logic bugs/fixes for processor 1102. For one embodiment, execution unit 1108 includes logic to handle a packed instruction set 1109. By including the packed instruction set 1109 in the instruction set of a general-purpose processor 1102, along with associated circuitry to execute the instructions, the operations used by many multimedia applications may be performed using packed data in a general-purpose processor 1102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1108 may also be used in micro controllers, embedded processors, graphics devices, DSPs, and other types of logic circuits. System 1100 includes a memory 1120. Memory 1120 includes a dynamic random access memory (DRAM) device, a static random access memory (SRAM) device, flash memory device, or other memory device. Memory 1120 stores instructions and/or data represented by data signals that are to be executed by the processor 1102.

Note that any of the aforementioned features or aspects of the embodiments of the disclosure may be utilized on one or more interconnect illustrated in FIG. 11. For example, an on-die interconnect (ODI), which is not shown, for coupling internal units of processor 1102 implements one or more aspects of the disclosure herein. Or the embodiments of the disclosure are associated with a processor bus 1110 (e.g. Intel Quick Path Interconnect (QPI) or other known high performance computing interconnect), a high bandwidth memory path 1118 to memory 1120, a point-to-point link 1114 to graphics accelerator 1112 (e.g. a Peripheral Component Interconnect express (PCIe) compliant fabric), a controller hub interconnect 1122, an I/O or other interconnect (e.g. USB, PCI, PCIe) for coupling the other illustrated components. Some examples of such components include the audio controller 1136, firmware hub (flash BIOS) 1128, wireless transceiver 1126, data storage 1124, legacy I/O controller 1110 containing user input and keyboard interfaces 1142, a serial expansion port 1138 such as Universal Serial Bus (USB), and a network controller 1134. USB ports can be configured and controlled as described herein above. The data storage device 1124 can comprise a hard disk drive, a floppy disk drive, a CD-ROM device, a flash memory device, or other mass storage device.

Figure 12:
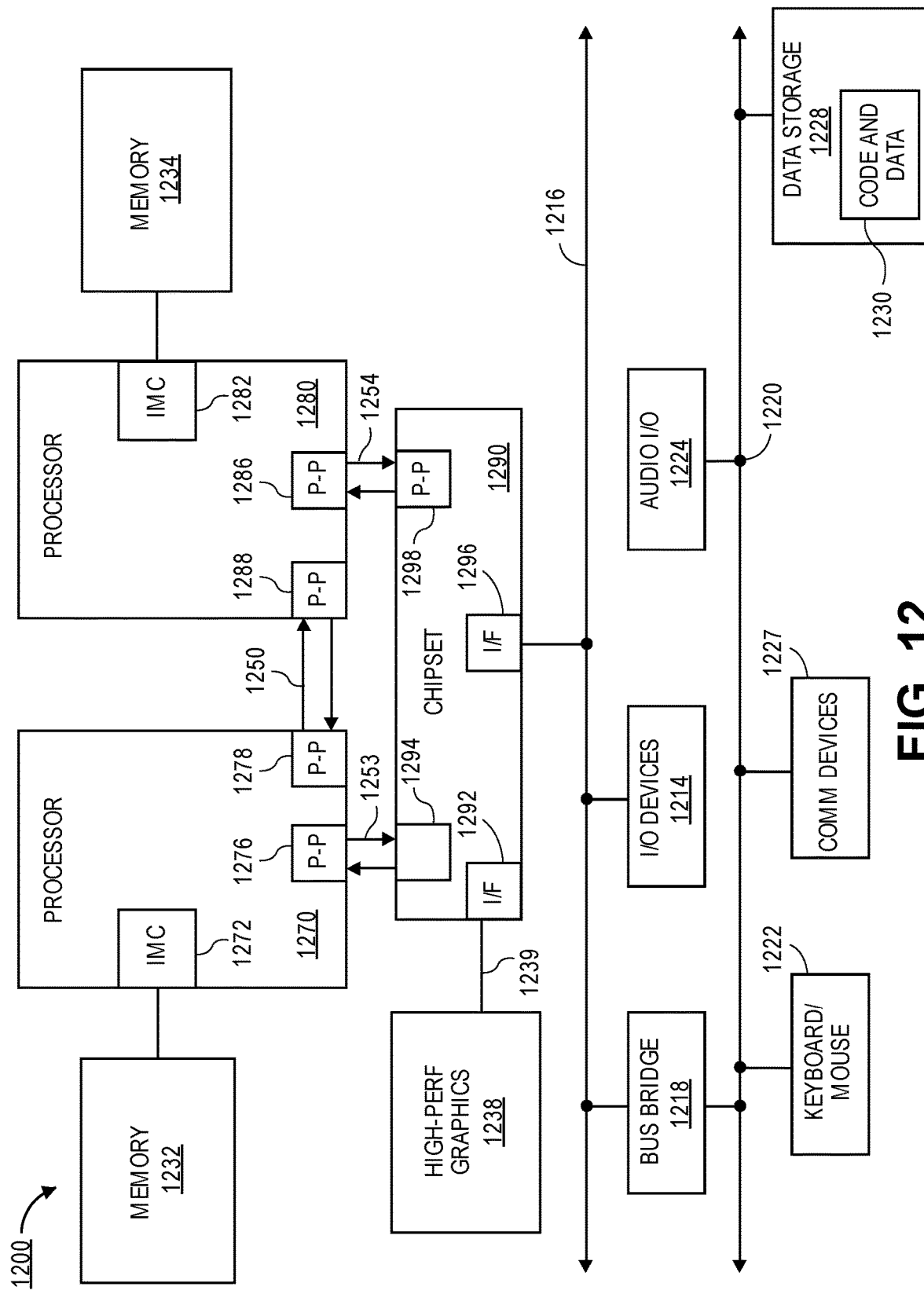
FIG. 12 illustrates another embodiment of a block diagram for a computing system.

Referring now to FIG. 12, shown is a block diagram of a second system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, embodiments of the disclosure may be implemented within the QPI architecture.

While shown with only two processors 1270, 1280, it is to be understood that the scope of the present disclosure is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture. USB controllers and ports can be included in the peripherals and can be configured as described herein above with relation to the embodiments.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Embodiments

The various embodiments include a communication port manager that includes a connection interface to configure connections between at least one communication port and a set of operational components, and an autonomous host detection (AHD) to detect a connection at the at least one communication port and to drive the connection interface to connect a host connected to the at least one communication port with at least one operational component from the set of operational components. The communication port manager can include the connection interface is a set of multiplexors that connect the set of operational components to each of the set of communication ports. The communication port manager can include the at least one communication port is any one of a Universal Serial Bus (USB) port, or a display port. The communication port manager can include wherein the AHD utilizes a timeout to enable a boot process for a connected system in response to a failure to detect a connection for a timeout period. The communication port manager can include, wherein the AHD enables the at least one communication port in response to a power up of the communication port manager. The communication port manager can include, wherein the AHD locks a connection between the at least one communication port and the at least one operation component at the connection interface in response to a successful establishment of a communication session between the at least one communication port and the at least one operational component.

The embodiments further include a method for communication port management in a device, the method including enabling a set of communication ports in response to power up of the device, detecting connection at a port in the set of communication ports prior to operating system boot of the device, and connecting an external device to an operational component of the device in response to the connection at the port. The method can further include checking whether a communication session has successfully been established between the operational component and the external device. The method can further include locking the connection between the external device and the operational component in response to establishment of a communication session. The method further including disconnecting the port and the external device in response to an unsuccessful establishment of a communication session. The method further including determining whether a boot process for the device can continue during a communication session of the external device and the device. The method further including enabling a boot process for the device to continue after expiration of a timeout for a successful communication session between the external device and the operational component.

The embodiments including a system that has a physical connector, and a system on a chip including a processing device, a memory device, an interconnect to communicatively couple the processing device and memory device, a connection interface to configure connections between a communication port tied to the physical connector and an operational component, and an autonomous host detection (AHD) to detect a connection at the communication port and to signal the connection interface to establish a communication path between the physical connector and the operational component. The system may include the connection interface being a set of multiplexors that connect the operational component to each of a set of communication ports. The communication port may be any one of a Universal Serial Bus (USB) port, or a display port. The AHD may utilizes a timeout to enable a boot process for a connected system in response to a failure to detect a connection for a timeout period. The AHD may enable the communication port in response to a power up of the system on the chip. The AHD may lock a connection between the communication port and the operation component at the connection interface in response to a successful establishment of a communication session between the communication port and the operational component.

The embodiments include a non-transitory computer readable medium having stored therein a set of instructions, which when executed cause a device to perform a set of operations to implement a method for communication port management in a device, the set of operations include receiving a signal indicating a connection at a communication ports prior to operating system boot of the device, and signaling a connection interface to couple an external device to an operational component of the device in response to the signal. The operations may also include determining whether a communication session has successfully been established between the operational component and the external device, locking the connection between the external device and the operational component in response to establishment of a communication session, and disconnecting the port and the external device in response to an unsuccessful establishment of a communication session. The operations may also include determining whether a boot process for the device can continue during a communication session of the external device and the device, and enabling a boot process for the device to continue after expiration of a timeout for a successful communication session between the external device and the operational component.

The embodiments further include a system configured to implement a method for communication port management in a device, with means for receiving a signal indicating a connection at a communication ports prior to operating system boot of the device, and means for signaling a connection interface to couple an external device to an operational component of the device in response to the signal. The system further including means for determining whether a communication session has successfully been established between the operational component and the external device, means for locking the connection between the external device and the operational component in response to establishment of a communication session, means for disconnecting the port and the external device in response to an unsuccessful establishment of a communication session, means for determining whether a boot process for the device can continue during a communication session of the external device and the device, and means for enabling a boot process for the device to continue after expiration of a timeout for a successful communication session between the external device and the operational component.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

What is claimed is:

1. A communication port manager comprising:
   a connection interface to configure connections between at least one communication port and a set of operational components, the set of operational components including a debug, diagnostic, or characterization controller; and
   an autonomous host detection (AHD) to detect a universal serial bus (USB) reset signal indicating a connection at the at least one communication port and to drive the connection interface to connect a host connected to the at least one communication port with at least one operational component from the set of operational components, wherein the AHD locks a connection between the at least one communication port and the at least one operation component at the connection interface in response to a successful establishment of a communication session between the at least one communication port and the at least one operational component.

2. The communication port manager of claim 1, wherein the connection interface is a set of multiplexors that connect the set of operational components to each of the set of communication ports.

3. The communication port manager of claim 1, wherein the at least one communication port is any one of a Universal Serial Bus (USB) port, or a display port.

4. The communication port manager of claim 1, wherein the AHD utilizes a timeout to enable a boot process for a connected system in response to a failure to detect a connection for a timeout period.

5. The communication port manager of claim 1, wherein the AHD enables the at least one communication port in response to a power up of the communication port manager.

6. A method for communication port management in a device, the method comprising:
   enabling, by an autonomous host detection (AHD), a set of communication ports in response to power up of the device;
   detecting, by the AHD, a universal serial bus (USB) reset signal indicating a connection at a port in the set of communication ports prior to operating system boot of the device;
   connecting, by the AHD, an external device to an operational component of the device in response to the connection at the port, the set of operational components including a debug, diagnostic, or characterization controller; and
   locking the connection between the external device and the operational component in response to establishment of a communication session.

7. The method of claim 6, further comprising:
   checking whether a communication session has successfully been established between the operational component and the external device.

8. The method of claim 6, further comprising:
   disconnecting the port and the external device in response to an unsuccessful establishment of a communication session.

9. The method of claim 6, further comprising:
   determining whether a boot process for the device can continue during a communication session of the external device and the device.

10. The method of claim 6, further comprising:
    enabling a boot process for the device to continue after expiration of a timeout for a successful communication session between the external device and the operational component.

11. A system comprising:
    a physical connector; and
    a system on a chip including a processing device, a memory device, an interconnect to communicatively couple the processing device and memory device, a connection interface to configure connections between a communication port tied to the physical connector and an operational component, where the operational component is a debug, diagnostic or characterization controller, and an autonomous host detection (AHD) to detect, a universal serial bus (USB) reset signal indicating a connection at the communication port and to signal the connection interface to establish a communication path between the physical connector and the operational component, wherein the AHD locks the connection between the at least one communication port and the at least one operation component at the connection interface in response to a successful establishment of a communication session between the at least one communication port and the at least one operational component.

12. The system of claim 11, wherein the connection interface is a set of multiplexors that connect the operational component to each of a set of communication ports.

13. The system of claim 11, wherein the communication port is any one of a Universal Serial Bus (USB) port, or a display port.

14. The system of claim 11, wherein the AHD utilizes a timeout to enable a boot process for a connected system in response to a failure to detect a connection for a timeout period.

15. The system of claim 11, wherein the AHD enables the communication port in response to a power up of the system on the chip.

16. The system of claim 11, wherein the AHD operates to establish the communication without an executing operating system.

17. The system of claim 11, wherein the communication port is enabled to operate in an Upstream Facing Port mode by setting the port with a 1.5 k ohm pullup resistance.

* * * * *